United States Patent
Ioffe (10) Patent No.: US 9,955,196 B2
(45) Date of Patent: Apr. 24, 2018

(54) SELECTIVE DEGRADATION OF VIDEOS CONTAINING THIRD-PARTY CONTENT

(71) Applicant: Google Inc., Mountain View, CA (US)

(72) Inventor: Sergey Ioffe, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 14/853,411

(22) Filed: Sep. 14, 2015

(65) Prior Publication Data
US 2017/0078718 A1    Mar. 16, 2017

(51) Int. Cl.
| | |
|---|---|
| *H04N 7/173* | (2011.01) |
| *H04N 21/2343* | (2011.01) |
| *H04N 21/234* | (2011.01) |
| *H04N 21/233* | (2011.01) |
| *H04N 21/2743* | (2011.01) |
| *H04N 21/8355* | (2011.01) |
| *H04N 21/845* | (2011.01) |

(52) U.S. Cl.
CPC ... *H04N 21/23439* (2013.01); *H04N 21/2335* (2013.01); *H04N 21/23418* (2013.01); *H04N 21/234345* (2013.01); *H04N 21/2743* (2013.01); *H04N 21/8355* (2013.01); *H04N 21/8456* (2013.01)

(58) Field of Classification Search
CPC ......... H04N 21/23418; H04N 21/2743; H04N 21/4542
See application file for complete search history.

(56) References Cited

U.S. PATENT DOCUMENTS

| | | | |
|---|---|---|---|
| 7,707,224 B2* | 4/2010 | Chastagnol | G06Q 30/06 707/705 |
| 8,135,724 B2* | 3/2012 | Smyers | G11B 27/034 348/592 |
| 8,572,121 B2 | 10/2013 | Chastagnol et al. | |
| 8,775,317 B2 | 7/2014 | Schmelzer | |
| 2002/0009000 A1 | 1/2002 | Goldberg et al. | |

(Continued)

OTHER PUBLICATIONS

U.S. Appl. No. 14/489,402, filed Sep. 17, 2014, 33 Pages.
PCT International Search Report and Written Opinion for PCT/IB2016/055411, dated Nov. 23, 2016, 10 pages.

*Primary Examiner* — Olugbenga Idowu
(74) *Attorney, Agent, or Firm* — Young Basile Hanlon & MacFarlane, P.C.

(57) ABSTRACT

A video server receives an uploaded video and determines whether the video contains third-party content and which portions of the uploaded video match third-party content. The video server determines whether to degrade the matching portions and/or how (e.g., extent, type) to do so. The video server separates the matching portion from original portions in the uploaded video and generates a degraded version of the matching content by applying an effect such as compression, edge distortion, temporal distortion, noise addition, color distortion, or audio distortion. The video server combines the degraded portions with the original portions to output a degraded version of the uploaded video. The video server stores and/or distributes the degraded version of the uploaded video. The video server may offer the uploading user licensing terms with the content owner that the user may accept to reverse the degradation.

19 Claims, 5 Drawing Sheets

(56) References Cited

U.S. PATENT DOCUMENTS

| | | | |
|---|---|---|---|
| 2004/0261099 A1* | 12/2004 | Durden | H04N 7/163 |
| | | | 725/32 |
| 2007/0033408 A1* | 2/2007 | Morten | H04L 63/1408 |
| | | | 713/176 |
| 2007/0174919 A1 | 7/2007 | Raines et al. | |
| 2009/0313546 A1* | 12/2009 | Katpelly | H04N 7/17318 |
| | | | 715/723 |
| 2010/0174608 A1 | 7/2010 | Harkness et al. | |
| 2012/0198490 A1 | 8/2012 | Mertens | |
| 2014/0020116 A1 | 1/2014 | Chastagnol et al. | |
| 2014/0152760 A1 | 6/2014 | Granstrom et al. | |

* cited by examiner

SELECTIVE DEGRADATION OF VIDEOS CONTAINING THIRD-PARTY CONTENT

BACKGROUND

1. Field

The disclosure generally relates to the field of video processing, and in particular to the field of selectively processing videos containing third-party content.

2. Description of the Related Art

A video server allows users to upload videos, which other users may watch using client devices to access the videos hosted on the video server. However, some users may upload content that contains content created by others, and to which the uploading user does not have content rights. When an uploading user combines this third-party content with original content into a single video, the presence of the original content in the combined video complicates the determination of whether the uploaded video contains third-party content.

SUMMARY

A video server stores videos, audio, images, animations, and/or other content. The video server stores content, in some cases uploaded through a client device, and serves the content to a user requesting the content through a client device. The video server may also store content acquired from a content owner such as a production company, a record label, or a publisher. When a user uploads content such as a video that includes content to which a third-party has content rights, the video server detects the third-party content and degrades the detected content. Some example portions of third-party content include a scene copied from another's video, an area within an image copied from another's image, an area within a sequence of video frames copied from another's video, or audio copied from another's audio or video.

When the video server receives an uploaded video, the video server determines whether the video contains third-party content and which portions of the uploaded video constitute that content. Based on a content owner policy or default policy, the video server determines whether and how to degrade the portion of the video that constitutes the third-party content. For example, the policy may specify a type or extent of content degradation. The video server separates the matching third-party portion from any original portions and generates a degraded version of the matching content by applying an effect such as compression, edge distortion, temporal distortion, noise addition, color distortion, or audio distortion. The video server combines the degraded matching portions with non-matching portions to output a degraded version of the video. The video server distributes the degraded version of the uploaded video in place of the original version.

The disclosed embodiments include a computer-implemented method, a system, and a non-transitory computer-readable medium. The disclosed embodiments may be applied to any content including videos, audio, images, animations, and other media. The features and advantages described in this summary and the following description are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description and the accompanying figures. A brief introduction of the figures is below.

DETAILED DESCRIPTION

The figures and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

Figure 1:
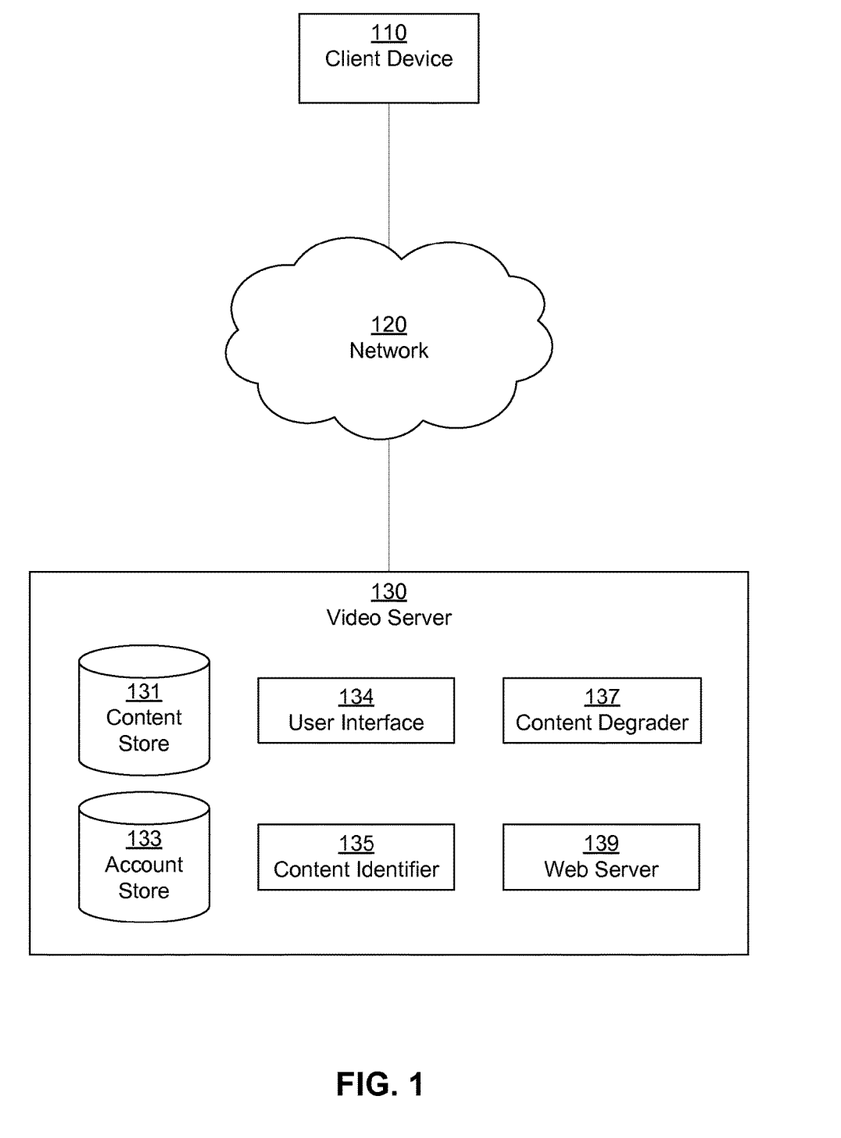
FIG. 1 is a block diagram of a networked computing environment for presenting videos or other media, in accordance with an embodiment.

FIG. 1 illustrates a block diagram of a networked environment for presenting videos or other media, in accordance with one embodiment. The entities of the networked environment include a client device 110, a network 120, and a video server 130. Although single instances of the entities are illustrated, multiple instances may be present. For example, multiple client devices 110 associated with multiple users upload content to a video server 130, and other client devices 110 request and present content from the video server 130. The functionalities of the entities may be distributed among multiple instances. For example, a content distribution network of servers at geographically dispersed locations implements the video server 130 to increase server responsiveness and to reduce content loading times.

A client device 110 is a computing device that accesses the video server 130 through the network 120. By accessing the video server 130, the client device 110 may fulfill user requests to browse and present content from the video server 130 as well as to upload content to the video server 130. Content (or media) refers to an electronically distributed representation of information and includes videos, audio, images, animation, and/or text. Content may be generated by a user, by a computer, by another entity, or by a combination thereof. A video is a set of video frames (i.e. images) presented over time and may include audio for concurrent presentation with the video frames. Presenting content refers to the client device 110 playing or displaying content using an output device (e.g., a display or speakers) integral to the client device 110 or communicatively coupled thereto.

The video server 130 may send the client device 110 previews of content requested by the user or recommended for the user. A content preview includes a thumbnail image, a title of the content, and the playback duration of the content, for example. The client device 110 detects an input from a user to select one of the content previews and requests the corresponding content from the video server 130 for presentation.

Figure 6:
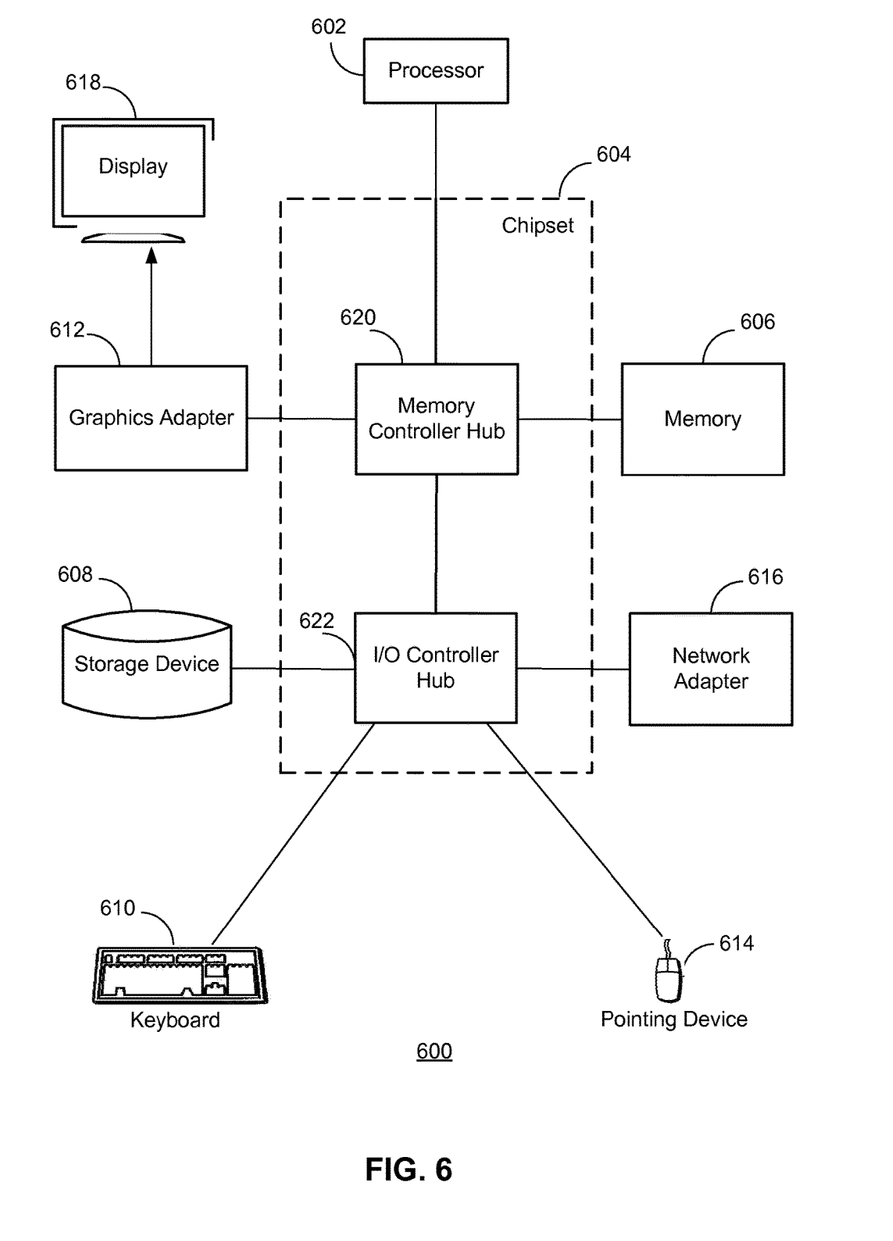
FIG. 6 is a high-level block diagram illustrating an example computer usable to implement entities of the content sharing environment, in accordance with one embodiment.

The client device 110 may be a computer, which is described further below with respect to FIG. 6. Example client devices 110 include a desktop computer, a laptop, a tablet, a mobile device, a smart television, and a wearable device. The client device 110 may contain software such as a web browser or an application native to an operating system of the client device 110 for presenting content from the video server 130. The client device 110 may include software such a video player, an audio player, or an animation player to support presentation of content.

The video server 130 stores content, in some cases uploaded through a client device 110, and serves the content to a user requesting the content through a client device 110. The video server 130 may also store content acquired from a content owner such as a production company, a record label, or a publisher. A content owner refers to an entity having the rights to control distribution of content. For example, a user who uploads original content is typically a content owner. When a user uploads content that includes content owned by another user (which we also refer to here as third-party content), the video server 130 detects the included content and applies a policy (e.g., removal, degradation) to the included content. Example portions of third-party content include a scene copied from another's video, an area within an image copied from another's image, an area within a sequence of video frames copied from another's video, or audio copied from another's audio or video.

The video server 130 may provide an interface for a content owner to configure video server policies regarding videos that include content matching portions of the content owner's videos. For example, a content owner can configure a policy that allows other users to upload matching content without restriction or a policy that instructs the video server 130 to remove or degrade the quality of the matching content. The content policy may also specify licensing terms that the uploading user may accept to reverse a removal or degradation of the matching content. Licensing terms refer to an arrangement with the content owner that permits distribution of the matching content and may involve monetary consideration. To apply an appropriate policy, the video server 130 determines the matching content's owner and accesses the relevant policy set by the content owner (or a default policy if the content owner has not configured a policy).

The network 120 enables communications among the entities connected thereto through one or more local-area networks and/or wide-area networks. The network 120 (e.g., the Internet) may use standard and/or custom wired and/or wireless communications technologies and/or protocols. The data exchanged over the network 120 can be encrypted or unencrypted. The network 120 may include multiple sub-networks to connect the client device 110 and the video server 130. The network 120 may include a content distribution network using geographically distributed data centers to reduce transmission times for content sent and received by the video server 130.

In one embodiment, the video server 130 includes modules such as a content store 131, an account store 133, a user interface module 134, a content identifier 135, a content degrader 137, and a web server 139. The functionality of the illustrated components may be distributed (in whole or in part) among a different configuration of modules. Some described functionality may be optional; for example, in one embodiment the video server 130 does not include an account store 133. Although many of the embodiments described herein describe degradation of third-party content in videos, the principles described herein may also apply to degradation of third-party content in audio, images, animations, or any other content.

The video server 130 stores media in the content store 131. The content store 131 may be a database containing entries each corresponding to a video and other information describing the video. The database is an organized collection of data stored on one or more non-transitory, computer-readable media. A database includes data stored across multiple computers whether located in a single data center or multiple geographically dispersed data centers. Databases store, organize, and manipulate data according to one or more database models such as a relational model, a hierarchical model, or a network data model.

A video's entry in the content store 131 may include the video itself (e.g., the video frames and/or accompanying audio) or a pointer (e.g., a memory address, a uniform resource identifier (URI), an internet protocol (IP) address) to another entry storing the video. The entry in the content store 131 may include associated metadata, which are properties of the video and may indicate the video's source (e.g., an uploader name, an uploader user identifier) and/or attributes (e.g., a video identifier, a title, a description, a file size, a file type, a frame rate, a resolution, an upload date, a channel including the content). Metadata may also indicate whether the video includes any portions that match content owned by an entity besides the uploader. In such a case, the video's entry may include an identifier of the matching original video and/or an identifier of the owner's account. The video's entry may also identify the matching portions using time ranges, video frame indices, pixel ranges, bit ranges, or other pointers to portions of the content.

The account store 133 contains account profiles of video server users and content owners. The account store 133 may store the account profiles as entries in a database. An account profile includes information provided by a user of an account to the video server, including a user identifier, access credentials, and user preferences. The account profile may include a history of content uploaded by the user or presented to the user, as well as records describing how the user interacted with such content. Insofar as the account store 133 contains personal information provided by a user, a user's account profile includes privacy settings established by a user to control use and sharing of personal information by the video server 130.

Account profiles of content owners include usage policies describing how the video server 130 processes uploaded videos that include content owned by the content owner. Usage policies may specify whether to degrade a portion of the uploaded video that matches the content owner's content. Degradation may refer to partial reduction in the intelligibility or aesthetic quality of a video relative to the initially uploaded version, e.g., through compression. In some embodiments, degradation may include a complete reduction in quality such as removing a matching scene from a video, silencing matching audio, or replacing the display area that contains matching content with a single color. The usage policy may indicate an extent of degradation (e.g., compression amount) or a type of degradation.

The user interface module 134 generates a graphical user interface that a user interacts with through software and input devices (e.g., a touchscreen, a mouse) on the client device 110. The user interface is provided to the client device 110 through the web server 139, which communicates with the software of the client device 110 that presents the user interface. Through the user interface, the user accesses video server functionality including browsing, experiencing, and uploading video. The user interface may include a media player (e.g., a video player, an audio player, an image viewer) that presents content. The user interface module 134 may display metadata associated with a video and retrieved from the content store 131. Example displayed metadata includes a title, upload date, an identifier of an uploading user, and content categorizations. The user interface module 134 may generate a separate interface for content owners to configure usage policies in the account store 133.

The content identifier 135 identifies portions of matching content from uploaded videos. The identified portion may be, for example, a display area in a video that corresponds to a television display in which another user's video is displayed. The content identifier 135 obtains digital summaries from various portions of an uploaded video and compares the digital summaries to a database of digital summaries for other content. The digital summary may be a fingerprint (i.e., a condensed representation of the content), a watermark (i.e., a perceptible or imperceptible marker inserted into the content by the content creator or distributor), or any other condensed information extracted from content to enable identification.

For audio, video, or other time-based content, the content identifier 135 may segment the content into different temporal portions (e.g., according to large changes in pixel values between two successive video frames or a moving average of audio characteristics). The content identifier 135 generates digital summaries from the temporal portions and identifies which of the digital summaries (if any) match a database of digital summaries. If a portion has a digital summary that matches another digital summary, the content identifier 135 labels the portion as a matching portion and associates it with an identifier of (or a pointer to) the third-party content.

The content identifier 135 may also identify portions within video frames that contain matching content. The content identifier 135 identifies multiple successive video frames that have a consistent display area within the multiple frames. Based on the content within the display area, the content identifier 135 generates a digital summary for this portion and compares the digital summary with the database of digital summaries to determine whether the portion of the video includes matching content. The content identifier 135 is described in further detail with respect to FIG. 2.

The content degrader 137 obtains uploaded videos containing third-party content and degrades the matching portions of uploaded video. Content degradation refers to any reduction in quality, which is the extent to which a copy of a degraded video conveys the information and sensory experiences present in the uploaded video. The content degrader 137 may reduce a video's quality by reducing the video's frame rate, bit rate, resolution, and/or file size. However, the content degrader 137 may also apply quality reductions that do not necessarily reduce the video's file size but that instead reduce or distort the video's semantic intelligibility (e.g., by blurring edges or by changing image colors or audio pitch). The content degrader 137 may select one or more types of degradation to apply based on the content owner's usage policy or based on a category assigned to the video. The content degrader 137 may also determine a quality reduction parameter that controls an extent or degree of degradation according to the video's content or the content owner's usage policy.

The web server 139 links the video server 130 via the network 120 to the client device 110. The web server 139 serves web pages, as well as other content, such as JAVA®, FLASH®, XML, and so forth. The web server 139 may receive uploaded content items from the one or more client devices 110. Additionally, the web server 139 communicates instructions from the user interface module 134 for presenting content and for processing received input from a user of a client device 110. Additionally, the web server 139 may provide application programming interface (API) functionality to send data directly to an application native to a client device's operating system, such as IOS®, ANDROID™, or WEBOS®.

Figure 2:
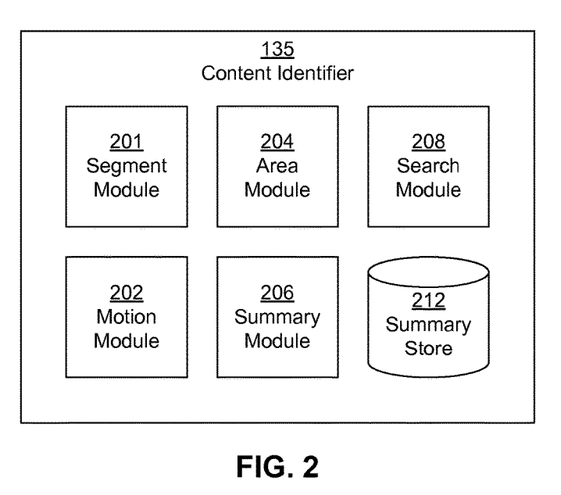
FIG. 2 is a block diagram of an example content identifier, in accordance with an embodiment.

FIG. 2 is a block diagram of an example content identifier 135, in accordance with an embodiment. The content identifier 135 includes a segment module 201, a motion module 202, an area module 204, a summary module 206, a search module 208, and a summary store 212. The functionality of the content identifier 135 may be provided by additional, different, or fewer modules than those described herein.

To identify third-party content present in portions of videos, the segment module 201 divides an uploaded video into scenes (i.e., sequences of one or more video frames spanning a portion of the video). To detect copying of entire scenes, the summary module 206 creates digital summaries of the scenes (as well as a digital summary from the video as a whole), and the search module 208 searches the summary store 212 to determine whether the video or any of its scenes match content in other videos.

To detect a combination of matching video content and original video content within one or more video frames, the content identifier 135 uses the motion module 202 and area module 204 to identify display areas within frames that may contain matching content. The summary module 206 generates digital summaries of the content within the identified display areas. The summary module 206 may generate a digital summary from a display area over all the frames of a video or over frames within a scene identified by the segment module 201. The search module 208 searches the summary store 212 to determine whether content within the identified one or more display areas matches content in other videos.

To identify matching portions of a video's audio, the segment module 201 divides the uploaded audio into tracks (i.e., sequences of audio samples spanning a portion of the video). The segment module 201 may rely on characteristics of the audio or may also use scene divisions determined for video accompanying the audio, if any. The summary module 206 generates digital summaries of the tracks (as well as a digital summary of the video's audio as a whole), and the search module 208 searches the summary store 212 to determine whether the audio or any of its tracks match any third-party audio. The operation of each module is now described in further detail.

The segment module 201 receives an uploaded video and divides the video into one or more time-based segments such as scenes (from the video's frames) and tracks (from the video's audio). The segment module 201 identifies temporally abrupt changes in the content to determine segment boundaries. The segment boundary may occur between video frames or audio samples, for example.

To identify segment boundaries, the segment module 201 determines content characteristics (i.e., aggregated properties of a part of the video) over the video's frames and/or audio samples. Based on a change (or a rate of change) in content characteristics between successive video portions, the segment module 201 determines segment boundaries. For example, the segment module 201 compares a change (or a rate of change) in content characteristics between successive video portions to a threshold and determines a segment boundary if the change (or rate of change) equals or exceeds a threshold change (or threshold rate of change).

Example changes in content characteristics between video frames include a total pixel-by-pixel difference between two frames, or a difference between average pixel values within a frame. The difference may be computed for one or more of a pixel's color channels (e.g., RGB (red, green, blue), YUV (luma, chroma)) or a summary of a pixel's color channels (e.g., luma or another overall black/white grayscale value across channels). For example, the segment module 201 determines a moving average (or other measure of central tendency) of each frame's average R, G, and B pixel values and determines the segment boundaries between scenes in response to the rate of change of the moving average exceeding a threshold at the segment boundary. Other example content characteristics include objects detected in a frame (e.g., lines, shapes, edges, corners, faces). If the set of objects detected in a frame contains less than a threshold number or proportion of objects in common with a next frame, then the segment module 201 may identify a segment boundary between the frames. The segment module 201 may determine a number of objects in common between frames by applying a motion vector to objects in one frame (as determined by the motion module 202) to determine predicted object positions in the next frame, and then determining whether the next frame contains matching objects in the predicted object positions.

Content characteristics of audio include an inventory of pitches (e.g., based on Fourier analysis), a rhythm spectrum (e.g., based on autocorrelation), or a timbre profile (e.g., based on mel-frequency cepstral coefficients (MFCC)) in a period of time before and/or after an audio sample. The segment module 201 may infer a tonal mode (e.g., a major or minor diatonic scale, a pentatonic scale) based on an inventory of tones within a threshold number of audio samples before and/or after a sample. Similarly, the segment module 201 may determine a rhythmic meter (e.g., time signature) for a sample according to the rhythm spectrum within a threshold time before and/or after the sample. The segment module 201 determines segment boundaries between tracks in response to identifying a shift in audio characteristics such as a shift in pitch inventor, rhythm spectrum, timbre profile, tonal mode, or rhythmic meter.

The segment module 201 outputs a set of low-level segments occurring between the identified segment boundaries. The segment module 201 may also output a series of higher-level (e.g., longer in time) segments by combining temporally adjacent low-level segments. Based on a comparison of overall content characteristics of two adjacent segments, the segment module 201 may merge them into a higher-level segment. For example, two low-level video segments correspond to different shots within a scene having consistent lighting, so the segment module 201 combines the low-level segments in response to determining that the segments have average color channel values (averaged over the frames in each segment) within a threshold difference. The segment module 201 outputs low-level segments, higher level segments comprising one or more consecutive low-level segments, and/or an overall segment comprising the entire video.

To determine whether to combine segments into a higher-level segment, the segment module 201 may determine a similarity score based on a weighted combination of differences in various content characteristics between two adjacent segments. In response to the similarity score exceeding a threshold score, the segment module 201 combines the adjacent segments into a higher-level segment. The segment module 201 may further combine segments into higher-level segments encompassing more frames and/or audio samples. The content identifier 135 compares the segments output by the segment module 201 to digital summaries of content owned by others to determine whether any of the segments contain third-party content.

The motion module 202 determines a motion vector quantifying angular motion in a video segment and removes the angular motion from the video segment. The motion module 202 analyzes a segment's video frames for changes in angular motion (vertical, horizontal and/or circular motion). For example, angular motion results from camera angle changes or from movement of an object within a video segment. Analysis of the video frames includes the motion module 202 comparing each frame of the video segment with one or more frames immediately preceding it in the segment. The motion module 202 determines whether vertical, horizontal, and/or circular motion occurred in the compared frame with respect to the one or more preceding frames. If vertical, horizontal, and/or circulation motion components are identified in the compared frame, the motion module 202 performs the necessary vertical, horizontal, and/or circular translation on the compared frame to remove the angular motion. Based on the translation of video frames that include angular motion, each frame of the segment appears to have been recorded by a stationary camera.

The area module 204 identifies display areas captured in a segment. After the motion module 202 removes angular motion from the video segment, the area module 204 analyzes the segment to identify a display area that displays other content during the segment. For example, the display area corresponds to a physical display in which playback of a third-party video was displayed during the creation of the user-generated video. For example, the display area may correspond to the display/screen of a television or a monitor. The display area is identified so that it can be separated from the other portions of the segment and so the summary module 206 may generate a digital summary that represents the content in the display area without the content captured outside the display area.

In one embodiment, the area module 204 identifies the top, bottom, left and right borders of the display area. To identify the top and bottom borders, the area module 204 analyzes each frame of the segment from the top to the bottom (and/or bottom to the top) and identifies edges. These edges are referred to as horizontal candidate edges.

For each horizontal candidate edge, the area module 204 classifies the candidate edge as varying or uniform based on the variety of brightness in the pixels of the edge. A varying edge will have a variety of brightness within the edge, where a uniform edge will not. To classify a horizontal candidate edge as varying or uniform, the area module 204 determines the brightness level of each of the edge's pixels. Based on the brightness levels of the pixels, the area module 204 calculates a median brightness value for pixels of the edge. The area module 204 determines the number of pixels in the edge whose brightness level is within a brightness threshold (e.g., within 5 values) of the median brightness and the number edge pixels whose brightness level is not within the brightness threshold of the median.

In one embodiment, the area module 204 classifies the edge as uniform if the number of pixels having a brightness level within the brightness threshold of the median (or other measure of central tendency) is greater than number of pixels whose brightness level is not within the threshold of the median. Otherwise, the area module 204 classifies the edge as varying. In another embodiment, the area module 204 classifies the edge as uniform if number of pixels whose brightness level is not within the brightness threshold of the median is greater than a certain number. Otherwise the area module 204 classifies the edge as varying.

For each horizontal candidate edge, the area module 204 compares the varying/uniform classification given to the same edge in each of a segment's frame to merge the classifications. If the horizontal candidate edge is given the same classification in each frame, the area module 204 assigns the same classification to the edge. For example, if in each frame the edge is given the classification of uniform, the area module 204 assigns the uniform classification to the edge. However, if the classification given to the horizontal candidate edge varies in the different frames, the area module 204 selects one of the classifications. In one embodiment, the area module 204 classifies the edge according to the edge's classification in a majority of the segment's frames. For example, if in majority of the frames the edge was classified as varying, the edge is assigned a varying classification. In another embodiment, if the classification given to the edge varies between frames, the area module 204 assigns a default classification (e.g., a uniform classification).

In another embodiment, instead of identifying each horizontal candidate edge in each frame and classifying each edge in each frame, the area module 204 blends the frames of the segment to generate a single blended frame. The area module 204 identifies horizontal candidate edges in the blended frame and classifies each edge as varying or uniform.

In addition to classifying each horizontal candidate edge as varying or uniform, the area module 204 also classifies each horizontal candidate edge as stable or dynamic. Each horizontal candidate edge is classified as stable or dynamic based on the variance of its pixels over time. Dynamic edges have pixels that change over time, whereas stable edges do not.

For each horizontal candidate edge, the area module 204 determines the variance of each of the edge's pixels throughout the frames of the segment. The area module 204 determines the number of pixels of the edge whose variance is less than a variance threshold (e.g., a value of 65) and the number of pixels whose variance is greater than the variance threshold. In one embodiment, the area module 204 classifies the horizontal candidate edge as stable if the number of pixels with variance less than the variance threshold is greater the number of pixels with variance greater than the variance threshold. Otherwise the area module 204 classifies the edge as dynamic. In another embodiment, the area module 204 classifies the horizontal candidate edge as stable if the number of pixels with variance less than the variance threshold is greater than a certain number. Otherwise the area module 204 classifies the edge as dynamic.

Based on the classifications of the horizontal candidate edges, the area module identifies an approximate top border and an approximate bottom border. To identify the approximate top border, the area module 204 starts at the top of one the frames (e.g., Y value of zero of the first frame or a blended frame) and goes down the frame until it identifies a horizontal candidate edge that has been classified as varying and/or dynamic. The area module 204 determines that the identified edge is the start of the display area because the edge has brightness variety (if classified as varying) and/or varies over time (if classified as dynamic). The area module 204 determines that the horizontal candidate edge immediately above/before the identified edge on the Y-axis is the approximate top border.

The area module 204 performs the same process for the approximate bottom border but starts at the bottom of the frame and goes up until it identifies a horizontal candidate edge classified as varying and/or dynamic. The area module 204 determines that the horizontal candidate edge immediately below the identified edge on the Y-axis is the approximate bottom border. The area module 204 may perform a Hough transform on the approximate top border and the approximate bottom border to identify the actual top border and bottom border of the display area.

To identify the vertical borders of the display area, the area module 204 rotates each frame of the segment 90 degrees. The area module 204 repeats the process used for identifying the top and bottom border to identify the left and right borders. In other words, the area module 204 identifies vertical candidate edges, classifies each vertical candidate edges as varying or uniform, classifies each vertical candidate edge as stable or dynamic, identifies an approximate left border and right border, and performs a Hough transform on the approximate borders to identify the left and right borders.

The area module 204 interconnects identified top, bottom, left, and right borders. The area enclosed by the interconnected borders is the display area in which the segment is displayed in the segment.

In another embodiment, instead of identifying the display area by identifying borders as described above, the area module 204 identifies the display area by analyzing motions within areas/regions and motion outside of these areas. In this embodiment, the area module 204 identifies multiple candidate areas in the frames of the segment. For each candidate area, the area module 204 analyzes the amount of motion within candidate area throughout the segment's frames and the amount of motion outside of the candidate area throughout the frames. The area module 204 selects a candidate area with motion within the area but little or no motion outside of the area as being a display area.

In one embodiment, to select the candidate area, the area module 204 determines for each candidate area a candidate score which is a measure indicative of the amount of motion within the candidate area compared to the amount of motion outside the area. In one embodiment, the greater the amount of motion within the candidate area compared to outside the candidate area, the greater the candidate score. From the multiple candidate areas, the area module 204 selects the candidate area with the greatest candidate score as being the display area.

As an alternative to identifying display areas in portions identified by the segment module 201, the area module 204 identifies a consistent display area present throughout an uploaded video. The segment module 201 may then crop the video to remove content outside of the display area and then identify segments of content within the cropped video.

The summary module 206 creates digital summaries for content portions, including for video and/or audio segments, as identified by the segment module 201, as well as display areas within video segments, as identified by the area module 204. For example, the summary module 206 creates a video fingerprint for a scene or an audio fingerprint for a track. As another example, the summary module 206 identifies a watermark inserted into a copied portion by the content's initial creator.

The summary module 206 generates digital summaries of a segment's audio, video frames, and any display areas identified within the segment. To create a digital summary of a display area in a segment, the summary module 206 identifies each frame of the segment that includes the display area. For each identified frame, the summary module 206 crops the frame to remove from the frame content included outside of the display area. In one embodiment, if necessary, the summary module 206 also performs perspective distortion on the display area if necessary.

The summary module 206 may also generate a summary of a segment's display area by blurring together frames from the segment and determining maximally stable extremal regions. This results in the summary module 206 generating a set of descriptors and transforming the descriptors into local quantized features. The summary module generates visterms, which are discrete representation of image characteristics each associated with a weight, from the local quantized features. The weights of visterms are summed to produce the digital summary.

The search module 208 searches for similar digital summaries in the summary store 212. The summary store 212 includes digital summaries generated from videos uploaded to the video server 130. The summary store 212 may also include digital summaries of content not accessible from the video server 130. The summary store 212 may include multiple digital summaries for a content item, where the different digital summaries correspond to different portions of the content item. Each digital summary stored in the summary store 212 includes an identifier of content to which the digital summary corresponds and/or an identifier of a content owner account of the third-party content.

For a digital summary created by the summary module 206 for a video, the search module 208 searches for digital summaries stored in the summary store 212 that are similar to the created digital summary. The search module 208 identifies a certain number of digital summaries (e.g., one or three digital summaries) that are most similar to the created digital summary. For each identified digital summary, the search module 208 determines whether the corresponding video segment matches the original video corresponding to the identified digital summary. The search module 208 provides identifiers of the content identifiers that correspond to the identified digital summaries to the content degrader 137.

Figure 3:
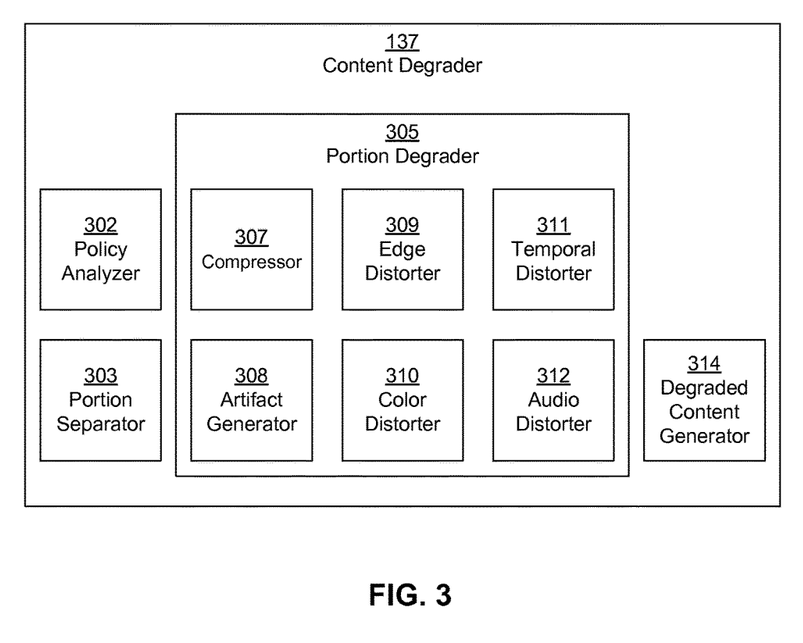
FIG. 3 is a block diagram of an example content degrader, in accordance with an embodiment.

FIG. 3 is a block diagram of an example content degrader 137, in accordance with an embodiment. The content degrader 137 includes a policy analyzer 302, a portion separator 303, a portion degrader 305, and a degraded content generator 314. The functionality of the content degrader 137 may be provided by additional, different, or fewer modules than those described herein.

The content degrader 137 receives a video containing one or more portions of content identified as matching third-party content by the content identifier 135. The policy analyzer 302 determines whether to degrade the matching content based on a policy set by the matching content's owner. The portion separator 303 separates the matching portions from original portions in the user-generated content. The portion degrader 305 applies one or more degradation effects to the separated portions. The degraded content generator 314 combines the degraded matching portions with non-matching portions to output a degraded version of the user-generated video.

The policy analyzer 302 receives as input an uploaded video, an identifier of the one or more portions of the uploaded video that contain third-party content, and an identifier of the one or more owners of the third-party content, e.g., as determined by the search module 208. The policy analyzer 302 determines one or more types of degradation to apply to the matching content by accessing a usage policy of the content owner. Where the video includes different portions matching content owned by different content owners, the policy analyzer 302 accesses the content owners' different policies so that the content degrader 137 may apply the appropriate policy to each differently owned portion. For example, if a video frame includes multiple display areas displaying differently owned third-party content, then the policy analyzer 302 determines different policies to apply to the respective display areas. In some embodiments, the policy analyzer 302 accesses a default policy to apply to third-party content owned by an entity that has not established a usage policy.

The policy analyzer 302 may determine a type or extent of degradation from the content owner's policy. For example, the content owner may select one or more degradation effects such as compression, distortion, noise addition, color modification, temporal distortion, or audio distortion, as described further with respect to the portion degrader 305. Alternatively or additionally, the policy analyzer 302 determines the type of degradation according to a property of the content such as a category associated with the content. For example, the policy analyzer 302 applies compression and noise addition to extreme sports videos and applies audio distortion to comedy videos.

The policy analyzer 302 may obtain a quality reduction parameter indicating the extent of quality reduction from the content owner's policy. For example, a content owner policy specifies degradation through compression and specifies a quality reduction parameter such as bit rate, frame rate, or resolution of the compressed video. The quality reduction parameter may be determined dynamically, as described further below with respect to the portion degrader 305.

The portion separator 303 separates the matching portion from the original content in the uploaded content, thereby preserving the original content from subsequent degradation. The portion separator 303 outputs a matching portion for degradation and an original portion for re-combination with the degraded matching portion. Where the matching portion is a copied video scene included between original scenes in the uploaded video, the portion separator 303 separates the copied video scene from the original scenes. If the matching portion is a video portion including a matching display area, the portion separator 303 identifies the frames of the video that include the display area. The portion separator 303 crops the identified frames to include only the pixels in the display area and outputs the cropped identified frames as the matching portion. The portion separator 303 outputs the original portion by combining the frames that do not include a display area with the pixels of the identified frames that are outside of the identified display area.

The portion separator 303 may separate matching audio from original audio. Where the matching audio occurs before and/or after the original audio, the portion separator 303 may isolate the matching audio from the original audio according to the time span or byte range determined by the content identifier 135. Where the matching audio includes third-party audio combined with original audio during a time span, the portion separator 303 may retrieve a copy of the third-party audio for comparison with the uploaded audio. The portion separator 303 generates an approximation of the original audio from the difference between the third-party audio and the uploaded audio. The portion separator 303 then outputs the matching audio for degradation and the approximation of the original audio for re-combination with the degraded audio.

The portion degrader 305 receives the matching portion isolated by the portion separator 303 and generates a degraded version of the matching portion. The portion degrader 305 degrades the matching portion according to a quality reduction parameter, which may be a default value or may be specified by the content owner's policy. In some embodiments, the portion degrader 305 determines the quality reduction parameter dynamically according to the amount of semantic information present in the content. The portion degrader 305 includes a compressor 307, an artifact generator 308, an edge distorter 309, a color distorter 310, a temporal distorter 311, and an audio distorter 312 to apply one or more degradation effects to the matching portion.

The compressor 307 receives a matching portion and applies lossy compression to the matching portion to generate the degraded portion. The compressor 307 may compress a video portion according to a quality reduction parameter indicating a compression parameter such as a frame rate, resolution, or bit depth of the compressed portion. The compressor 307 may compress the video by re-transcoding the video to a lower frame rate, discarding pixels, applying a low-pass filter, or performing local spatial averaging of pixel values to reduce resolution, for example. The compressor 307 may compress an audio portion according to a quality reduction parameter indicating a compression parameter such as a sample rate, bit depth, or bit rate. The compressor 307 may compress the audio portion by down-sampling, applying a low-pass filter, or truncating bits of audio samples, for example.

In some embodiments, the compressor 307 dynamically determines a compression parameter dynamically according to the content of the matching portion. In one embodiment, the compression parameter is determined according to a quality reduction parameter specifying a proportion of information to discard (e.g., 20%). The compressor 307 determines one or more compression parameters to achieve the proportion of discarded information. For example, the compressor 307 applies a frequency transform to the matching portion and determines a proportion of information in various frequency components. The compressor 307 then determines a cutoff frequency component, where the frequency components above the cutoff frequency components correspond to the specified proportion of information to discard. The compressor 307 then applies a low-pass filter with the cutoff frequency component to discard the specified proportion of information.

In one embodiment, the compressor 307 dynamically applies compression to a sub-portion of the matching portion in response to detecting an object of interest in the sub-portion. For a matching video portion, the compressor 307 determines the position of an object of interest such as a face, article, or text. The compressor 307 may identify the object of interest using various computer vision techniques (e.g., edge matching, geometric hashing, interpretation trees). The compressor 307 determines the sub-portion to substantially cover the object of interest and then compresses the sub-portion. For a matching audio portion, the compressor 307 may determine the temporal position of speech or other semantically meaningful content. The compressor determines the sub-portion to include audio in the same time range as the audio of interest and then compresses audio in the sub-portion. The sub-portion containing the content of interest may be compressed to a greater extent or lesser extent than the remainder of the matching portion depending on content owner preferences, for example.

The artifact generator 308 receives a matching portion and degrades it by adding one or more artifacts to the matching portion. Example artifacts added to a video include text, an image (e.g., a watermark, a logo), or an animation. The artifact may be added to individual frames or may persist through multiple frames. For example, the artifact is a logo of the original content creator. The artifact generator 308 may create the artifact according to a quality reduction parameter indicating an artifact property such as type, size, or position. For example, the content owner specifies for the artifact to be a translucent green blob occupying the middle third of the matching content. The artifact may be an interactive element including a pointer specified by the content owner. When the interactive element is selected, the client device 110 retrieves content for presentation using the pointer.

The artifact generator 308 may also generate audio artifacts. The artifact may be an audio artifact (e.g., sound effect, music, text-to-speech) mixed with the matching portion. The audio artifact may be a default audio file, a file received from a content owner, or a dynamically generated file. For example, the artifact generator 308 generates the audio artifact from random noise (e.g., white noise) or from a sound effect occurring at random intervals. Example artifact parameters for audio artifacts include the relative mixing level between volumes of the matching audio and the artifact audio, or a proportion of the matching audio including audio artifacts.

The artifact generator 308 may identify a sub-portion of the matching content containing content of interest, as explained above with respect to the compressor 307. The artifact generator 308 may selectively insert artifacts to obscure the content of interest (e.g., replacing faces with logos) or preserve the content of interest (e.g., adding white noise outside the sub-portion containing the content of interest). To partially degrade semantic intelligibility, the artifact generator 308 may add artifacts to a part of the sub-portion containing the content of interest.

The edge distorter 309 receives a matching portion and degrades the matching portion by distorting edges in the matching portion. For example, the edge distorter 309 blurs edges of a video by applying a Gaussian blur, a band pass filter, or a band stop filter to the matching portion. Similarly, the edge distorter 309 may reduce the crispness of audio by applying any of these techniques. The edges may be distorted according a quality reduction parameter such as a Gaussian blur radius or one or more band stop or band pass cutoff frequencies.

In some embodiments, the edge distorter 309 may detect edges (e.g., using Canny edge detection, differential edge detection) in a matching portion of a video and selectively modify the edges. The edge distorter 309 may rank the edges by an importance score (e.g., by average contrast along each edge, by each edge's length) and modify a subset of the edges according to the ranking. As part of identifying edges, the edge distorter 309 may identify objects (as described above) and then identify the edges of those objects. To modify edges, the edge distorter 309 may apply an effect such as changing a thickness of an edge, selectively blurring the edge to reduce contrast, adding an artifact, or modifying a color or the edge. The edge distorter 309 may determine the quality reduction parameter according to the properties of the detected edges. For example, the edge distorter 309 determines a Gaussian blur radius in proportion to the contrast along a detected edge.

The color distorter 310 receives a matching video portion and degrades the matching portion by modifying colors in the matching portion. The color distorter 310 may apply a color transformation that maps colors from the video's one or more initial color channels to one or more modified color channels. For instance, the color distorter 310 converts a video from color (two or more initial channels) to grayscale (one modified channel). As another example, the color distorter 310 inverts a matching portion's colors. The color distorter 310 may eliminate color information by discarding a color channel. For example, the color distorter 310 eliminates the red and green channels, to leave only the blue channel, or the color distorter 310 eliminates the Y (intensity) and U (first chroma) channels to leave only the V (second chroma) channel.

The transformation between color channels may be represented as one or more weighted combinations of the input channels, where the weights correspond to quality reduction parameters specified by a content owner. In some embodiments, the color distorter 310 dynamically determines the weights of the color transformation according to an analysis of the matching portion. For example, the color distorter 310 determines an amount of information contained in each color channel (e.g., determined from principal component analysis) and determines the weights to reduce the total information by a specified proportion. For example, the color distorter 310 discards the color channel containing the least information (by setting the color channel's weight to zero).

In one embodiment, the color distorter 310 selectively modifies colors of sub-portions of an image. The color distorter 310 may identify a sub-portion containing an object of interest (as described above) and modify the colors within the sub-portion. The color distorter 310 may selectively modify the colors of objects by modifying the colors within objects of interest bounded by detected edges. Within detected edges, the color distorter may replace an area having a similar color (i.e., color values within a threshold) with a single color, thereby applying a cartoon effect to the area.

The temporal distorter 311 applies a temporal distortion affect to a matching portion. The temporal distorter 311 may distort a video by applying a slow-motion effect or a fast-forward effect. To apply the slow-motion effect, the temporal distorter 311 interpolates video frames between the matching portion's frames. Similarly, to apply a fast-forward effect, the temporal distorter 311 reduces frames from the matching portion. The temporal distorter 311 may distort a video by up-sampling or down-sampling the audio without modifying the playback rate of the audio samples. This effect provides a slow or fast effect and also modifies pitches. The degree of temporal distortion is determined by a quality reduction parameter such as playback ratio, which is the ratio of the matching portion's original playback duration to distorted playback duration. The temporal distorter 311 may apply the temporal distortion to a sub-portion of the matching content that contains a portion of interest, or to the entire matching portion.

The audio distorter 312 applies an audio distortion effect to a matching audio portion. The audio distorter 312 may apply an audio distortion effect such as a pitch shift, timbre modification, or volume distortion. For example, the audio distorter 312 modifies the pitches (tones) of the matching audio by applying a frequency transform to the audio, multiplying the frequencies by a pitch distortion factor, and applying an inverse transform to generate the distorted audio. As another example, the audio distorter 312 applies timbre modification by modifying the frequencies corresponding to overtones of principal frequencies. The audio distorter may apply the audio distortion effect to a sub-portion of the audio containing content of interest or to the entire matching portion.

The degraded content generator 314 receives a degraded content portion from the portion degrader 305 and an original content portion from the portion separator. The degraded content generator combines the degraded content portion with the original content portion to generate a degraded version of the uploaded content. Where the matching portion is a video scene, the degraded content generator 314 combines the matching scene with original video portion while maintaining the relative order of frames from the original scene and matching scene present in the uploaded content.

Where the matching portion is a display area within a video scene, the degraded content generator 314 obtains the frames from the video scene that contains the matching display area. The degraded content generator 314 generates degraded video frames to replace these frames by combining a degraded version of the display area with the original content outside the display area. The degraded video frames are then combined (along with any video frames that do not include the matching content) into a degraded video scene.

Where the matching portion is audio, the degraded content generator 314 combines the approximation of the original content determined by the portion separator 303 with the degraded audio from the portion degrader 305. For example, the degraded audio and the approximation of the original audio are mixed with volume levels to recreate the same volume ratio as in the uploaded audio or to reduce the volume of the degraded matching audio.

The degraded content generator 314 may provide the degraded content to a client device requesting the uploaded content, or the degraded content generator 314 may store the degraded content in the content store 131 for later retrieval.

Figure 4:
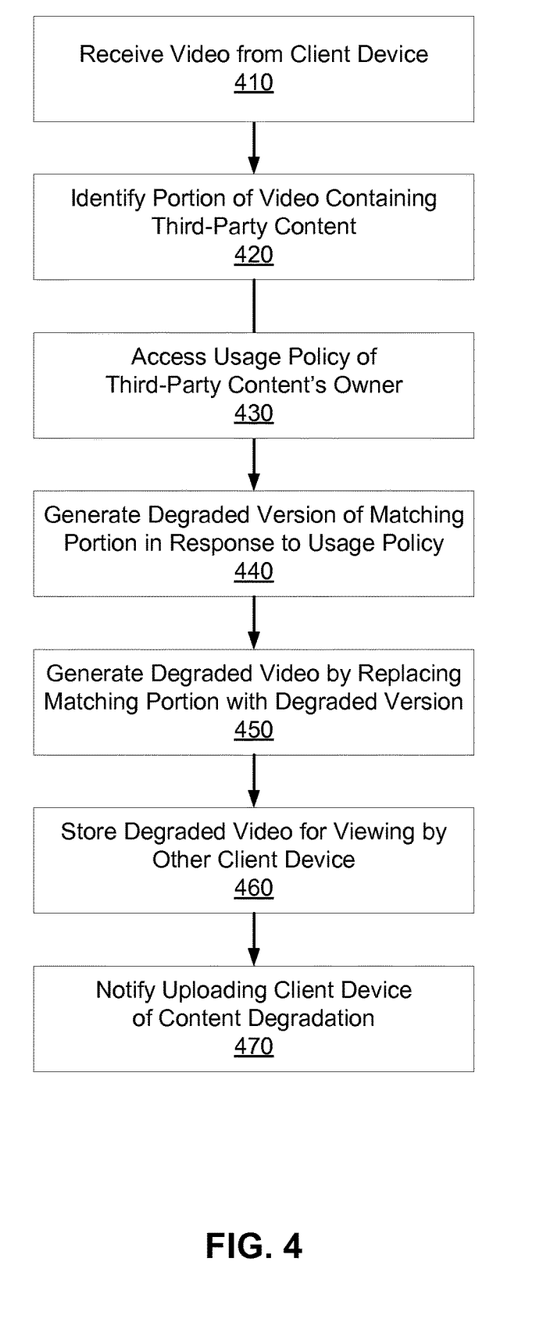
FIG. 4 is a flowchart illustrating an example process for processing an uploaded video containing third-party content, in accordance with an embodiment.

FIG. 4 is a flowchart illustrating an example process for processing an uploaded video containing matching content, in accordance with an embodiment. The process described herein may be performed in a different order or using different, fewer, or additional steps. For example, some steps may be performed serially or concurrently. Although described with respect to generating a video, the process may be performed to process audio or other media containing uploaded content.

The video server 130 receives 410 video from client device 110. The uploaded video includes a combination of third-party content and original content. The third-party content may be an entire video scene, an individual frame, or a part of a frame (a display area) containing content created by another entity.

The content identifier 135 identifies 420 a portion of video containing third-party content. For example, the summary module 206 generates a digital summary of that portion of the video, and the search module 208 matches the digital summary to a digital summary (in the summary store 212) of third-party content not owned by the uploading user.

The policy analyzer 302 accesses 430 a policy specifying the content owner's preferences towards use of its content. The usage policy may specify whether to degrade the matching content. In some cases, the usage policy may further specify a type of degradation to apply or a quality reduction parameter controlling the extent of content degradation. In some embodiments, the policy analyzer 302 may access 430 a default policy for matching content.

The portion degrader 305 generates 440 a degraded version of the matching portion according to the accessed policy by applying a quality reduction to the matching portion. For example, a matching video scene is degraded by applying a quality reduction to the scene's video frames. As another example, a matching display area within a video scene is degraded by applying a quality reduction within the matching display area. As another example, audio accompanying the video is degraded.

The portion degrader 305 may determine the type of degradation based on the content owner policy or based on another property of the matching content (e.g., a category assigned by the uploading user). In some instances, the portion degrader 305 identifies a sub-portion (e.g., an area) containing an object of interest within the matching portion, and the portion degrader 305 selectively degrades the matching portion based on the identified sub-portion. In some instances, the portion degrader 305 determines a quality reduction parameter according to content owner policy or variation present in the matching portion and degrades the matching portion according to the quality reduction parameter. The quality reduction parameter may be determined for an entire video scene or on a frame-by-frame basis.

The degraded content generator 314 generates 450 a degraded video by replacing the matching portion with the degraded version of the matching portion. For example, an original video scene is combined with a degraded scene, a degraded display area is combined with an original portion outside the display area, or original audio is combined with degraded audio.

The degraded content generator 314 may store 460 the degraded video in the content store 131. Subsequently, the video server 130 provides the degraded video to client devices 110 requesting the uploaded video. The video server 130 may access the degraded video from the content store 131 in response to a client device request, or the video server 130 may use the content degrader 137 to generate the degraded video in response to the request from the client device 110 by accessing an original version of the uploaded video in the content store 131. In some embodiments, the user interface module 134 may include an offer for the requesting user to access the original version of the matching content by paying a fee to the content owner.

The video server 130 notifies 470 the uploading user's client device 110 that the uploaded content has been degraded. Notifying the uploading user may include offering the uploading user licensing terms to restore access by other users to the initial version of the uploaded content.

Figure 5:
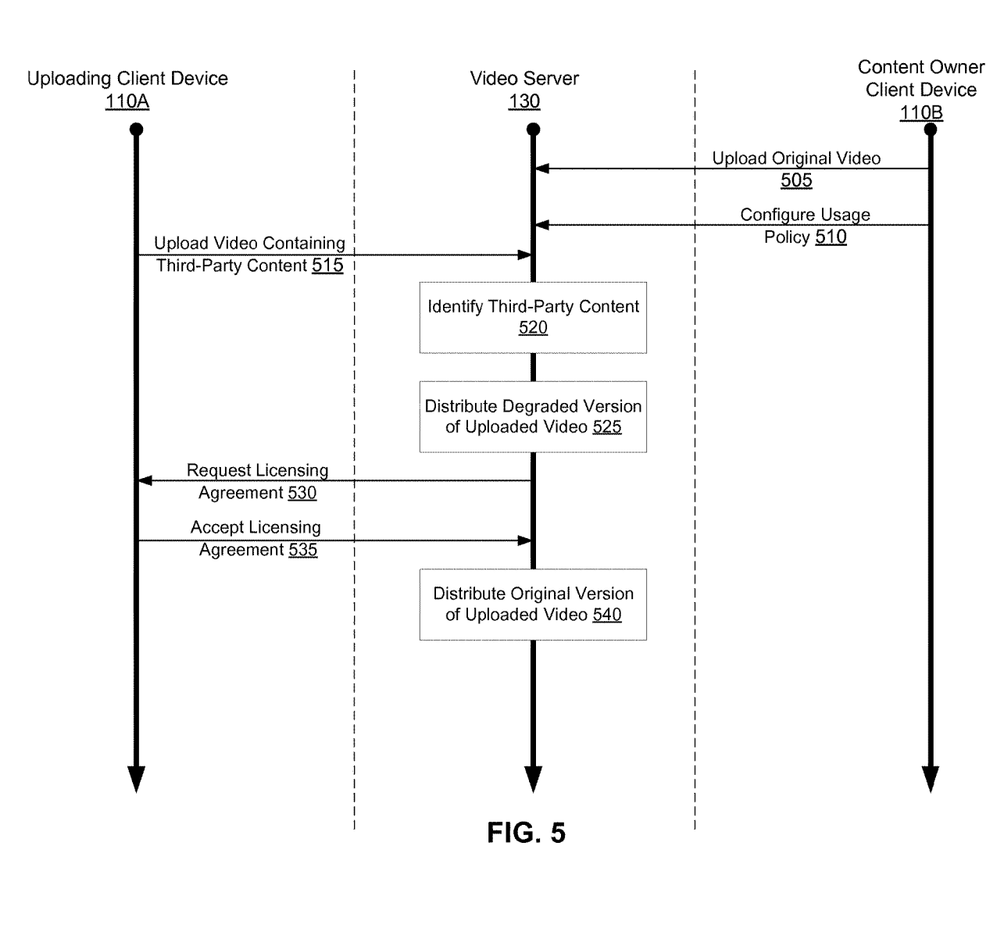
FIG. 5 is an interaction diagram illustrating a process of detecting third-party content and arranging a license with the third party, in accordance with an embodiment.

FIG. 5 is an interaction diagram illustrating a process of detecting third-party content and arranging a license with the third party, in accordance with an embodiment. The illustrated steps may be performed in a different order or using different, fewer, or additional steps. For example, some steps may be performed serially or concurrently. Although described with respect to distributing a video, the process may be performed to process audio or other media containing uploaded content.

The content owner client device 110B uploads 505 an original video to the content server. The content owner may also configure 510 a usage policy indicating whether to block, allow, or degrade content that matches the owner's original content. The usage policy may also include licensing terms (e.g., a fee, a share of ad revenues). An uploading client device 110A uploads 515 a video that contains a portion (or the entirety) of the content owner's video.

The content identifier 135 identifies 520 the third-party content in the uploaded content of the original content. The content degrader 137 generates a degraded version of the uploaded content, and the video server 130 distributes 525 the degraded version. The video server 130 also requests 530 a licensing agreement from the uploading user by sending a notification to client device 110A. The licensing agreement may be a default agreement or may be specified by the content owner's usage policy. If the uploading user accepts 535 the licensing agreement, the content server distributes 540 an original version of the uploaded video. The video server 130 may store the original version while distributing 525 the degraded version, or the video server 130 may instead request the uploading user to re-upload the original version.

The client device 110 and the video server 130 are each implemented using computers. FIG. 6 is a level block diagram illustrating an example computer 600 usable to implement entities of the content sharing environment, in accordance with one embodiment. The example computer 600 has sufficient memory, processing capacity, network connectivity bandwidth, and other computing resources to process and serve uploaded content as described herein.

The computer 600 includes at least one processor 602 (e.g., a central processing unit, a graphics processing unit) coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The processor 602 may include one or more processors 602 having one or more cores that execute instructions. The pointing device 614 is a mouse, touch-sensitive screen, or other type of pointing device, and in some instances is used in combination with the keyboard 610 to input data into the computer 600. The graphics adapter 612 displays video, images, and other media and information on the display 618. The network adapter 616 couples the computer 600 to one or more computer networks (e.g., network 120).

The computer 600 is adapted to execute computer program modules for providing functionality described herein including presenting content, playlist lookup, and/or metadata generation. As used herein, the term "module" refers to computer program logic used to provide the specified functionality. Thus, a module can be implemented in hardware, firmware, and/or software. In one embodiment of a computer 600 that implements the video server 130, program modules such as the content identifier 135 and the content degrader 137 are stored on the storage device 608, loaded into the memory 606, and executed by the processor 602.

The types of computers 600 used by the entities of the content sharing environment can vary depending upon the embodiment and the processing power required by the entity. For example, the client device 110 is a smart phone, tablet, laptop, or desktop computer. As another example, the video server 130 might comprise multiple blade servers working together to provide the functionality described herein. The computers 600 may contain duplicates of some components or may lack some of the components described above (e.g., a keyboard 610, a graphics adapter 612, a pointing device 614, a display 618). For example, the video server 130 run in a single computer 600 or multiple computers 600 communicating with each other through a network such as in a server farm.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the video server 130 may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for processing uploaded content. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

I claim:

1. A computer-implemented method for processing an uploaded video, the method comprising:
    receiving, by a computer system from an uploading user's client device, an uploaded video including content that includes a combination of original content and third-party content;
    dividing, by the computer system, the uploaded video into scenes that include one or more frames and span a portion of the uploaded video, wherein dividing the uploaded video into scenes includes determining a moving average of each frame's pixel values and determining segment boundaries for each scene using corresponding frame moving averages and a rate of change threshold;
    generating, by the computer system, a digital summary for each scene, wherein a digital summary for a scene is generated based on content associated with a respective portion spanned by the scene;
    identifying, by the computer system, a matching portion of the uploaded video containing the third-party content in response to a match between the digital summary associated with the matching portion and the digital summary associated with the third-party content;
    identifying, by the computer system, an original portion of the video containing the original content;
    identifying, by the computer system, a content owner of the third-party content;
    accessing, by the computer system, a usage policy associated with the content owner;
    determining, by the computer system, to degrade the third-party content based on the usage policy;
    responsive to determining to degrade the third-party content, generating, by the computer system, a degraded video by:
        generating a degraded version of the matching portion by applying a quality reduction to the matching portion; and
        combining the identified original portion with the degraded version of the matching portion to generate the degraded video; and
    storing, by the computer system, the degraded video for distribution to a requesting user's client device in response to a request to view the uploaded video.

2. The method of claim 1, wherein the original content comprises an original video scene and the matching portion comprises a video scene matching the third-party content, and wherein generating the degraded video comprises:
    generating a degraded video scene by applying a quality reduction to video frames in the matching video scene; and
    generating the degraded video by combining the original video scene with the degraded video scene.

3. The method of claim 1, wherein the matching portion comprises a video scene having a display area matching the third-party content, the matching display area bordered by an original display area in the video scene, and wherein generating the degraded video comprises:
    generating a degraded version of the matching display area by applying a quality reduction to the matching display area in the video scene;
    generating a degraded scene by combining the original display area with the degraded version of the matching display area; and generating the degraded video by replacing the scene in the uploaded video with the degraded scene.

4. The method of claim 1, wherein the matching portion comprises a video scene matching the third-party content, and wherein generating the degraded video comprises:
   identifying sub-areas of frames within the matching video scene that contain an object of interest;
   generating degraded frames by replacing the identified sub-areas with degraded versions of the identified sub-areas; and
   generating the degraded video by combining the degraded frames with the original content.

5. The method of claim 1, wherein the matching portion comprises a matching audio portion occurring within the uploaded video, and wherein generating the degraded video comprises:
   generating a degraded audio portion by applying an audio quality reduction to the matching audio portion; and
   generating the degraded video by replacing the matching audio portion in the uploaded video with the degraded audio portion.

6. The method of claim 1, wherein generating the degraded version of the matching portion comprises:
   determining a quality reduction parameter based on an amount of variation in the matching portion; and
   applying the quality reduction to the matching portion, an extent of the quality reduction corresponding to the determined quality reduction parameter.

7. The method of claim 1, wherein generating the degraded version of the matching portion comprises:
   determining a plurality of quality reduction parameters each corresponding to one of a sequence of video frames within the matching portion based on an amount of variation in each video frame; and
   applying the quality reduction to each video frame, an extent of each frame's quality reduction corresponding to the quality reduction parameter determined for each video frame.

8. The method of claim 1, wherein generating the degraded version of the matching portion comprises:
   determining a type of quality reduction for the matching portion according to a category assigned to the uploaded video; and
   applying the determined type of quality reduction to the matching portion.

9. The method of claim 1, wherein generating the degraded video comprises:
   accessing a quality reduction parameter specified by the usage policy; and
   applying the quality reduction to the matching portion according to the accessed quality reduction parameter.

10. A non-transitory, computer-readable storage medium comprising instructions for processing an uploaded video, the instructions executable by a processor to perform steps comprising:
    receiving, by a computer system from an uploading user's client device, an uploaded video including content that includes a combination of original content and third-party content;
    dividing, by the computer system, the uploaded video into scenes that include one or more frames and span a portion of the uploaded video, wherein dividing the uploaded video into scenes includes determining a moving average of each frame's pixel values and determining segment boundaries for each scene using corresponding frame moving averages and a rate of change threshold;
    generating, by the computer system, a digital summary for each scene, wherein a digital summary for a scene is generated based on content associated with a respective portion spanned by the scene;
    identifying, by the computer system, a matching portion of the uploaded video containing the third-party content in response to a match between the digital summary associated with the matching portion and the digital summary associated with the third-party content;
    identifying, by the computer system, an original portion of the video containing the original content;
    determining, by the computer system, to degrade the third-party content based on a usage policy associated with the third-party content;
    generating a degraded version of the matching portion by applying a quality reduction to the matching portion; and
    combining an identified original portion of the video containing the original content with the degraded version of the matching portion to generate a degraded video.

11. The storage medium of claim 10, wherein the original content comprises an original video scene and the matching portion comprises a video scene matching the third-party content, and wherein generating the degraded video comprises:
    generating a degraded video scene by applying a quality reduction to video frames in the matching video scene; and
    generating the degraded video by combining the original video scene with the degraded video scene.

12. The storage medium of claim 10, wherein the matching portion comprises a video scene having a display area matching the third-party content, the matching display area bordered by an original display area in the video scene, and wherein generating the degraded video comprises:
    generating a degraded version of the matching display area by applying a quality reduction to the matching display area in the video scene;
    generating a degraded scene by combining the original display area with the degraded version of the matching display area; and
    generating the degraded video by replacing the scene in the uploaded video with the degraded scene.

13. The storage medium of claim 10, wherein the matching portion comprises a video scene matching the third-party content, and wherein generating the degraded video comprises:
    identifying sub-areas of frames within the matching video scene that contain an object of interest;
    generating degraded frames by replacing the identified sub-areas with degraded versions of the identified sub-areas; and
    generating the degraded video by combining the degraded frames with the original content.

14. The storage medium of claim 10, wherein the matching portion comprises a matching audio portion occurring within the uploaded video, and wherein generating the degraded video comprises:
    generating a degraded audio portion by applying an audio quality reduction to the matching audio portion; and
    generating the degraded video by replacing the matching audio portion in the uploaded video with the degraded audio portion.

15. The storage medium of claim 10, wherein generating the degraded version of the matching portion comprises:

determining a quality reduction parameter based on an amount of variation in the matching portion; and applying the quality reduction to the matching portion, an extent of the quality reduction corresponding to the determined quality reduction parameter.

16. The storage medium of claim 10, wherein generating the degraded version of the matching portion comprises:

determining a plurality of quality reduction parameters each corresponding to one of a sequence of video frames within the matching portion based on an amount of variation in each video frame; and applying the quality reduction to each video frame, an extent of each frame's quality reduction corresponding to the quality reduction parameter determined for each video frame.

17. The storage medium of claim 10, wherein generating the degraded version of the matching portion comprises:

determining a type of quality reduction for the matching portion according to a category assigned to the uploaded video; and applying the determined type of quality reduction to the matching portion.

18. A system for processing an uploaded video, the system comprising:

a processor;

a non-transitory, computer-readable storage medium comprising instructions executable by the processor to perform steps comprising:

receiving, from an uploading user's client device, an uploaded video including content that includes a combination of original content and third-party content;

dividing the uploaded video into scenes that include one or more frames and span a portion of the uploaded video, wherein dividing the uploaded video into scenes includes determining a moving average of each frame's pixel values and determining segment boundaries for each scene using corresponding frame moving averages and a rate of change threshold;

generating a digital summary for each scene, wherein a digital summary for a scene is generated based on content associated with a respective portion spanned by the scene;

identifying a matching portion of the uploaded video containing the third-party content in response to a match between the digital summary associated with the matching portion and the digital summary associated with the third-party content;

identifying an original portion of the video containing the original content;

identifying a content owner of the third-party content;

accessing a usage policy associated with the content owner;

determining to degrade the third-party content based on the usage policy;

responsive to determining to degrade the third-party content, generating a degraded video by:

generating a degraded version of the matching portion by applying a quality reduction to the matching portion; and combining the identified original portion with the degraded version of the matching portion to generate the degraded video; and storing the degraded video for distribution to a requesting user's client device in response to a request to view the uploaded video.

19. The method of claim 1, wherein the usage policy specifies terms and the method further comprises:

transmitting the terms to the requesting user's client device; and responsive to receiving an indication of acceptance of the terms by the requesting user, transmitting to the requesting user's client device a version of the uploaded video without degradation.

* * * * *